United States Patent
Khedr et al.

(10) Patent No.: US 11,726,210 B2
(45) Date of Patent: Aug. 15, 2023

(54) INDIVIDUAL IDENTIFICATION AND TRACKING VIA COMBINED VIDEO AND LIDAR SYSTEMS

(71) Applicant: COM-IoT Technologies, Dubai (AE)

(72) Inventors: Haitham Khedr, Cairo (EG); Ahmed Madkor, Dubai (AE)

(73) Assignee: COM-IoT Technologies, Dubai (AE)

( * ) Notice: Subject to any disclaimer, the term of this patent is extended or adjusted under 35 U.S.C. 154(b) by 279 days.

(21) Appl. No.: 16/941,214

(22) Filed: Jul. 28, 2020

(65) Prior Publication Data

US 2020/0356826 A1 Nov. 12, 2020

Related U.S. Application Data

(63) Continuation of application No. PCT/IB2019/001470, filed on Aug. 5, 2019.
(Continued)

(51) Int. Cl.
| | |
|---|---|
| *G06K 9/62* | (2022.01) |
| *G01S 17/89* | (2020.01) |
| *G06T 7/80* | (2017.01) |
| *G06T 7/521* | (2017.01) |
| *G06V 20/64* | (2022.01) |
| *G06V 40/16* | (2022.01) |
| *G06F 18/25* | (2023.01) |
| *G06V 20/52* | (2022.01) |
| *G06V 40/10* | (2022.01) |

(52) U.S. Cl.
CPC ............ *G01S 17/89* (2013.01); *G06F 18/251* (2023.01); *G06T 7/521* (2017.01); *G06T 7/80* (2017.01); *G06V 20/52* (2022.01); *G06V 20/64* (2022.01); *G06V 40/103* (2022.01); *G06V 40/161* (2022.01); *G06V 40/172* (2022.01); *G06T 2207/10028* (2013.01); *G06T 2207/30201* (2013.01)

(58) Field of Classification Search
CPC ......... G06K 9/6289; G06T 7/80; G06T 7/521; G06T 2207/10028; G06T 2207/30201; G06V 20/64; G06V 40/161; G01S 17/89
See application file for complete search history.

(56) References Cited

U.S. PATENT DOCUMENTS

| | | | |
|---|---|---|---|
| 10,163,256 B2 * | 12/2018 | Benedek | G06V 20/64 |
| 10,215,858 B1 * | 2/2019 | Klein | G01S 17/89 |

(Continued)

*Primary Examiner* — Gregory M Desire
(74) *Attorney, Agent, or Firm* — DLA Piper LLP (US)

(57) ABSTRACT

Individual identification and tracking are provided via combined video and LiDAR systems. In various embodiments, a virtual plane may be generated. A video frame including the virtual plane is recorded via a first imaging modality. One or more objects are detected in the video frame when the one or more objects enters the virtual plane. An identifier is assigned to each of the one or more objects. One or more three-dimensional shapes are detected at the second imaging modality when the one or more three-dimensional shapes enters the virtual plane. For each of the one or more objects, a corresponding shape of the one or more three-dimensional shapes is determined. Each identifier is assigned to the respective corresponding shape of the one or more three-dimensional shapes. After assigning each identifier, a plurality of positional data is recorded for each of the one or more three-dimensional shapes.

19 Claims, 6 Drawing Sheets

Related U.S. Application Data (60) Provisional application No. 62/714,749, filed on Aug. 5, 2018.

(56) References Cited

U.S. PATENT DOCUMENTS

| | | | |
|---|---|---|---|
| 10,410,086 B2 * | 9/2019 | Bapat | H04N 7/18 |
| 10,482,321 B2 * | 11/2019 | Kusens | G06V 40/23 |
| 10,600,191 B2 * | 3/2020 | Kim | G06V 20/52 |
| 10,671,068 B1 * | 6/2020 | Xu | G06N 20/10 |
| 10,684,625 B2 * | 6/2020 | Miller | B60T 8/17 |
| 10,769,461 B2 | 9/2020 | Madkor et al. | |
| 11,307,309 B2 | 4/2022 | Sadek et al. | |
| 2009/0174573 A1 | 7/2009 | Smith | |
| 2011/0184895 A1 | 7/2011 | Janssen | |
| 2012/0081542 A1 | 4/2012 | Suk et al. | |
| 2013/0054090 A1 | 2/2013 | Shin et al. | |
| 2016/0232415 A1 | 8/2016 | L'Heureux et al. | |
| 2017/0108338 A1 * | 4/2017 | Larnaout | H04W 4/021 |
| 2018/0321758 A1 | 11/2018 | Serban et al. | |
| 2018/0348346 A1 * | 12/2018 | Vallespi-Gonzalez | G01S 13/931 |
| 2019/0137622 A1 | 5/2019 | Lopez-Hinojosa et al. | |
| 2019/0180467 A1 | 6/2019 | Li et al. | |
| 2019/0385457 A1 | 12/2019 | Kim et al. | |
| 2020/0356826 A1 * | 11/2020 | Khedr | G06V 20/52 |
| 2021/0103289 A1 | 4/2021 | Templeton et al. | |
| 2021/0146932 A1 | 5/2021 | Smith et al. | |

* cited by examiner

INDIVIDUAL IDENTIFICATION AND TRACKING VIA COMBINED VIDEO AND LIDAR SYSTEMS

CROSS-REFERENCE TO RELATED APPLICATIONS

This application is a continuation of International Application No. PCT/IB2019/001470, filed Aug. 5, 2019, which claims the benefit of U.S. Provisional Application No. 62/714,749, filed Aug. 5, 2018, each of which is hereby incorporated by reference in its entirety.

BACKGROUND

Embodiments of the present disclosure relate to individual identification and tracking via combined video and LiDAR systems, and more specifically, to detecting and identifying a person utilizing facial recognition and tracking this person as they move within the field of view of a LiDAR sensor or an array of LiDAR sensors.

BRIEF SUMMARY

According to embodiments of the present disclosure, systems for, methods of, and computer program products for individual detection and tracking are provided. In various embodiments, the system includes a first imaging modality, a second imaging modality, and a computer node including a computer readable storage medium having program instructions embodied therewith, the program instructions executable by a processor of the computing node to cause the processor to perform a method where a virtual plane disposed at a first distance from the first imaging modality and a second distance from the second imaging modality is generated. A video frame including the virtual plane is recorded via the first imaging modality. One or more objects are detected in the video frame when the one or more objects enters the virtual plane. An identifier is assigned to each of the one or more objects. One or more three-dimensional shapes are detected at the second imaging modality when the one or more three-dimensional shapes enters the virtual plane. For each of the one or more objects, a corresponding shape of the one or more three-dimensional shapes is determined. Each identifier is assigned to the respective corresponding shape of the one or more three-dimensional shapes. After assigning each identifier, a plurality of positional data is recorded for each of the one or more three-dimensional shapes.

In various embodiments, the method includes generating a virtual plane disposed at a first distance from the first imaging modality and a second distance from the second imaging modality. A video frame including the virtual plane is recorded via the first imaging modality. One or more objects are detected in the video frame when the one or more objects enters the virtual plane. An identifier is assigned to each of the one or more objects. One or more three-dimensional shapes are detected at the second imaging modality when the one or more three-dimensional shapes enters the virtual plane. For each of the one or more objects, a corresponding shape of the one or more three-dimensional shapes is determined. Each identifier is assigned to the respective corresponding shape of the one or more three-dimensional shapes. After assigning each identifier, a plurality of positional data is recorded for each of the one or more three-dimensional shapes.

In various embodiments, the computer program product a computer readable storage medium having program instructions embodied therewith, the program instructions executable by a processor to cause the processor to perform a method where a virtual plane disposed at a first distance from the first imaging modality and a second distance from the second imaging modality is generated. A video frame including the virtual plane is recorded via the first imaging modality. One or more objects are detected in the video frame when the one or more objects enters the virtual plane. An identifier is assigned to each of the one or more objects. One or more three-dimensional shapes are detected at the second imaging modality when the one or more three-dimensional shapes enters the virtual plane. For each of the one or more objects, a corresponding shape of the one or more three-dimensional shapes is determined. Each identifier is assigned to the respective corresponding shape of the one or more three-dimensional shapes. After assigning each identifier, a plurality of positional data is recorded for each of the one or more three-dimensional shapes.

DETAILED DESCRIPTION

In various embodiments of the present disclosure, systems, methods and computer program products are provided for detecting and identifying a person utilizing facial recognition, and then tracking and/or monitoring this person as they move within the field of view of a LiDAR sensor or an array of LiDAR sensors. In various embodiments, the systems, methods, and computer program products provide for sensor fusion across two different imaging modalities to thereby provide continuity of data when handing off the detecting of one or more individuals using a first imaging modality to the monitoring/tracking of the one or more individuals using a second imaging modality. This assists in intelligent security, where the person may be a wanted and known person through a list. The person may also be a missing or lost person that is being sought.

Systems according to the present disclosure perform individual identification and tracking by applying object detection, tracking, and machine learning algorithms on LiDAR-camera feeds. An advantage of such systems is the ability to track multiple individuals in an area and tag each one with his/her name.

Figure 1:
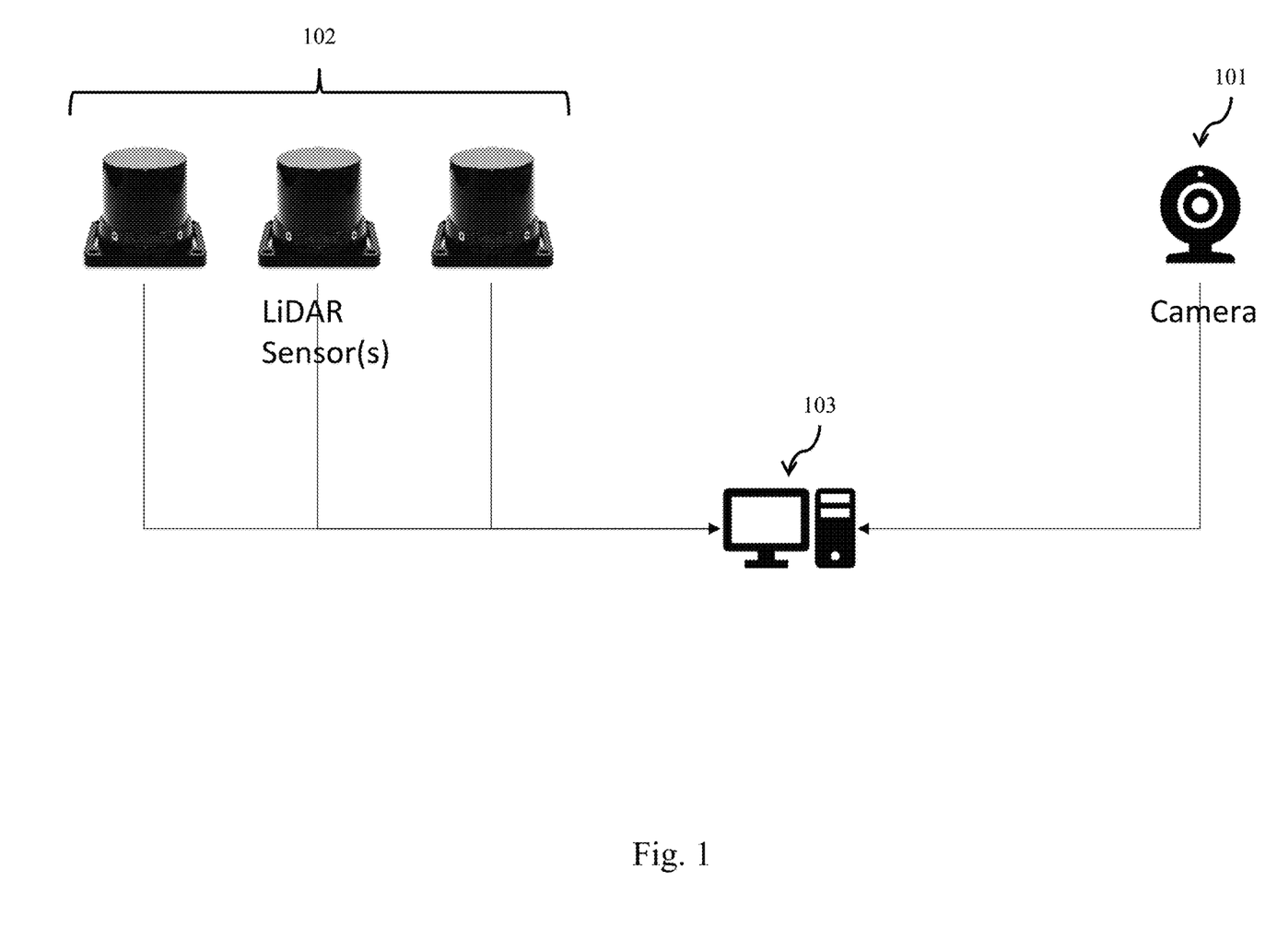
FIG. 1 illustrates a system for individual detection and tracking according to embodiments of the present disclosure.

Referring to FIG. 1, an exemplary system according to the present disclosure is illustrated. The system consists of one or more cameras 101 and one or more LiDAR sensors 102. The user can configure multiple zones of interest in the scene, each of these zones may have different security level which affects who can be present in the zone. Cameras are installed on the entry or exit of each configured zone. Data are provided from camera 101 and LiDAR 102 to computing node 103 for further processing.

Figure 2:
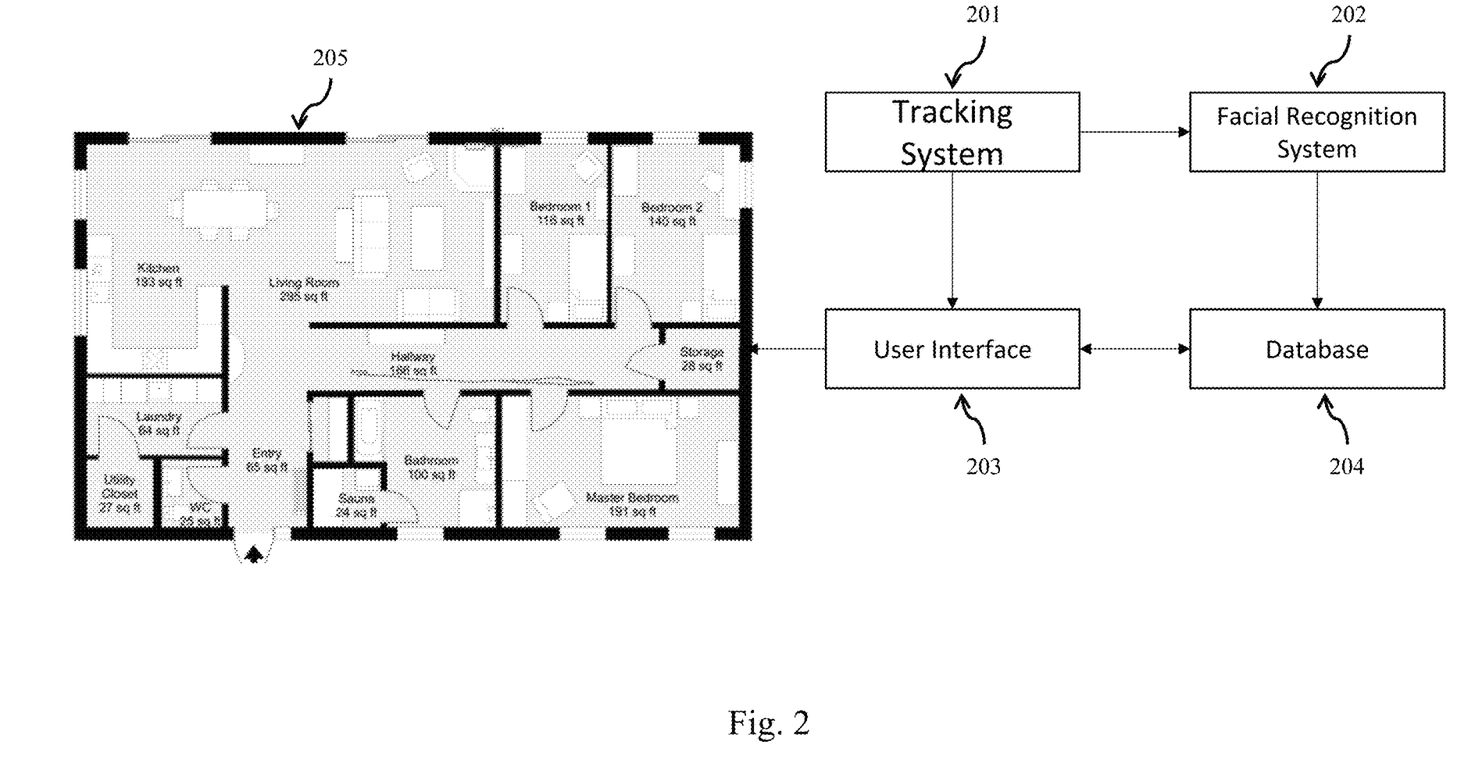
FIG. 2 illustrates a method for individual detection and tracking according to embodiments of the present disclosure.

Referring to FIG. 2, an exemplary process according to the present disclosure is illustrated. A tracking system 201 sends a subject identifier to facial recognition 202 when a subject enters camera view. Tracking system 201 also sends an updated location of every subject with its identifier to user interface 203. Facial recognition system 202 identifies a given subject, and stores the subject identifier and subject name in database 204. User interface 203 communicates with database 204 to fetch the names and identifiers of subjects that are spotted by tracking system 201. The user interface then provides visualization 205 of subjects within a given space.

In various embodiments, A LiDAR frame divided into multiple user-configured zones is captured. The LiDAR frame is provided to an individual detection algorithm that detects individuals and tracks them. Once an individual is detected entering a certain zone, a notification is sent via a network. The notification includes a unique identifier for each tracked individual together with its position. The notification triggers the capture of a video frame from the corresponding zone and records the event into a database. Individuals are then identified by a trained facial-recognition classifier. Such a classifier is trained to detect the location of all faces in the image and identify each one of them.

Based on this detection, an alert may be generated if the individual is prohibited to enter this zone. For example, in some embodiments, video and associated detections are stored in a data store. In some embodiments, video and associated detections are sent to web server for visualization. A user, such as a police officer, may then take appropriate action based on the alert. Alerts may also be sent via a network to various third-party systems.

It will be appreciated that a variety of learning system are suitable for facial recognition as set out herein. In some embodiments, a feature vector is provided to the learning system. Based on the input features, the learning system generates one or more outputs. In some embodiments, the output of the learning system is a feature vector.

In some embodiments, the learning system comprises a SVM. In other embodiments, the learning system comprises an artificial neural network. In some embodiments, the learning system is pre-trained using training data. In some embodiments training data is retrospective data. In some embodiments, the retrospective data is stored in a data store. In some embodiments, the learning system may be additionally trained through manual curation of previously generated outputs.

In some embodiments, the learning system is a trained classifier. In some embodiments, the trained classifier is a random decision forest. However, it will be appreciated that a variety of other classifiers are suitable for use according to the present disclosure, including linear classifiers, support vector machines (SVM), or neural networks such as recurrent neural networks (RNN).

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

A LiDAR zone is the area within a space that is covered by the LiDAR sensor(s). A camera zone(s) is the area covered by the camera(s). These zones overlap, and in some embodiments can be coextensive in scope, as the LiDAR will trigger the camera based on the presence of a person in the overlapping area to initially trigger facial recognition.

In exemplary embodiments, a LiDAR sensor tracks everyone with an assigned ID number and publishes their X&Y location to a point cloud. A numeric identifier may be assigned by the LiDAR tracking system, which is passed to the facial recognition module and assigned the name/identification recognized and is then used for the user interface. In some embodiments, facial recognition is provided by a module hosted as a web service that is triggered by the tracking mechanism whenever a person walks into the detection zone.

Once facial recognition detects a person, an identifier is assigned to that person, and the movement of that identifier is tracked within a scene. Accordingly, a given person need only be recognized once using the camera and the facial recognition software, and then the person is tracked using the LiDAR sensor. This identification process allows the software to know where a specific person is, in comparison to where persons are located without their identity being know.

In various embodiments, a visual track is provided on screen showing the motion of a person within an area. Each path may be accompanied by the name of the person as derived from facial recognition. In some embodiments, a track ID is shown for a given person until facial recognition is complete. For example, in some embodiments, once a person reaches a predetermined zone with camera coverage, the facial recognition is triggered to determine the identity of the given tracked individual. At that point, the identification may be shown in the user interface or logged with continuous (X, Y) locations of that individual for publication.

In various embodiments, when it is detected that a user has entered a predetermined zone, the latest frame from a camera trained on that zone is retrieved. The image is provided to the facial recognition system. The personal information/identification of the person is determined to a given confidence level. In various embodiments, the user information is recorded in a database, for example with an image URL, name and other personal info, tracked Object ID from the LiDAR's published point cloud, tracked object location (X&Y) from the LiDAR's published point cloud, and a confidence rate.

The predetermined detection zone is used for the camera's facial recognition. In some embodiments, the predetermined zone is established at a natural choke point that limits the number of people to one at a time. For example, the zone may correspond to a door or other entrance. One camera can have multiple zones (e.g., 3 or 4) as it detects and identifies each zone's person. For example, multiple zones may correspond to individual turnstiles in a row.

In exemplary embodiments, a detection zone may be 100 m by 100 m. In general, the detection zone is covered by both LiDAR and by camera.

In exemplary embodiments, 30 persons may be tracked at a distance of up to 50 meters. In exemplary embodiments, the systems described herein may track any suitable number of people (e.g., 100,000 people) and may be scaled up to track even more people with additional imaging hardware (e.g., video cameras and LiDAR devices).

Figure 3A:
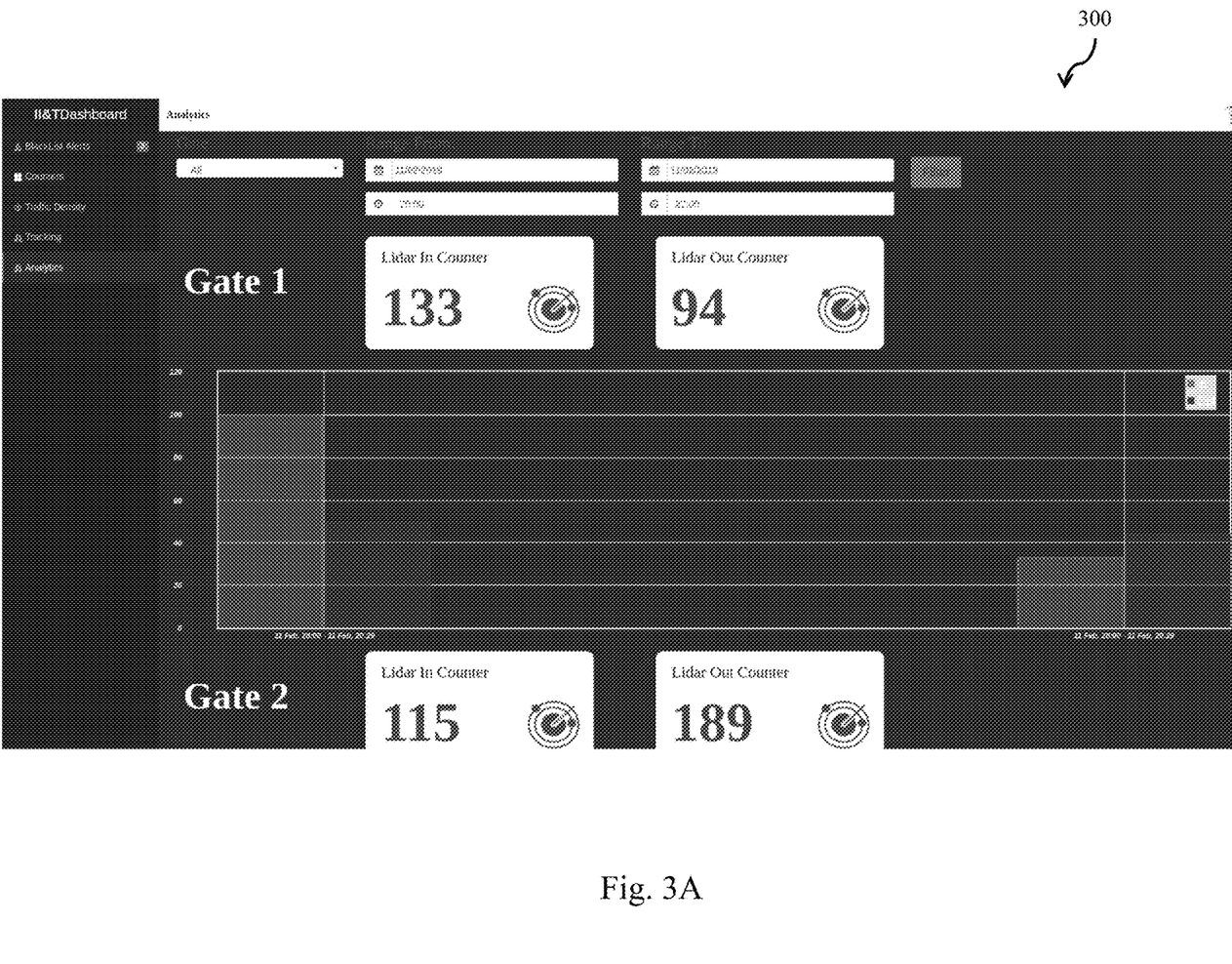
FIGS. 3A-3B illustrate a user interface for an individual detection and tracking system according to embodiments of the present disclosure.
Figure 3B:
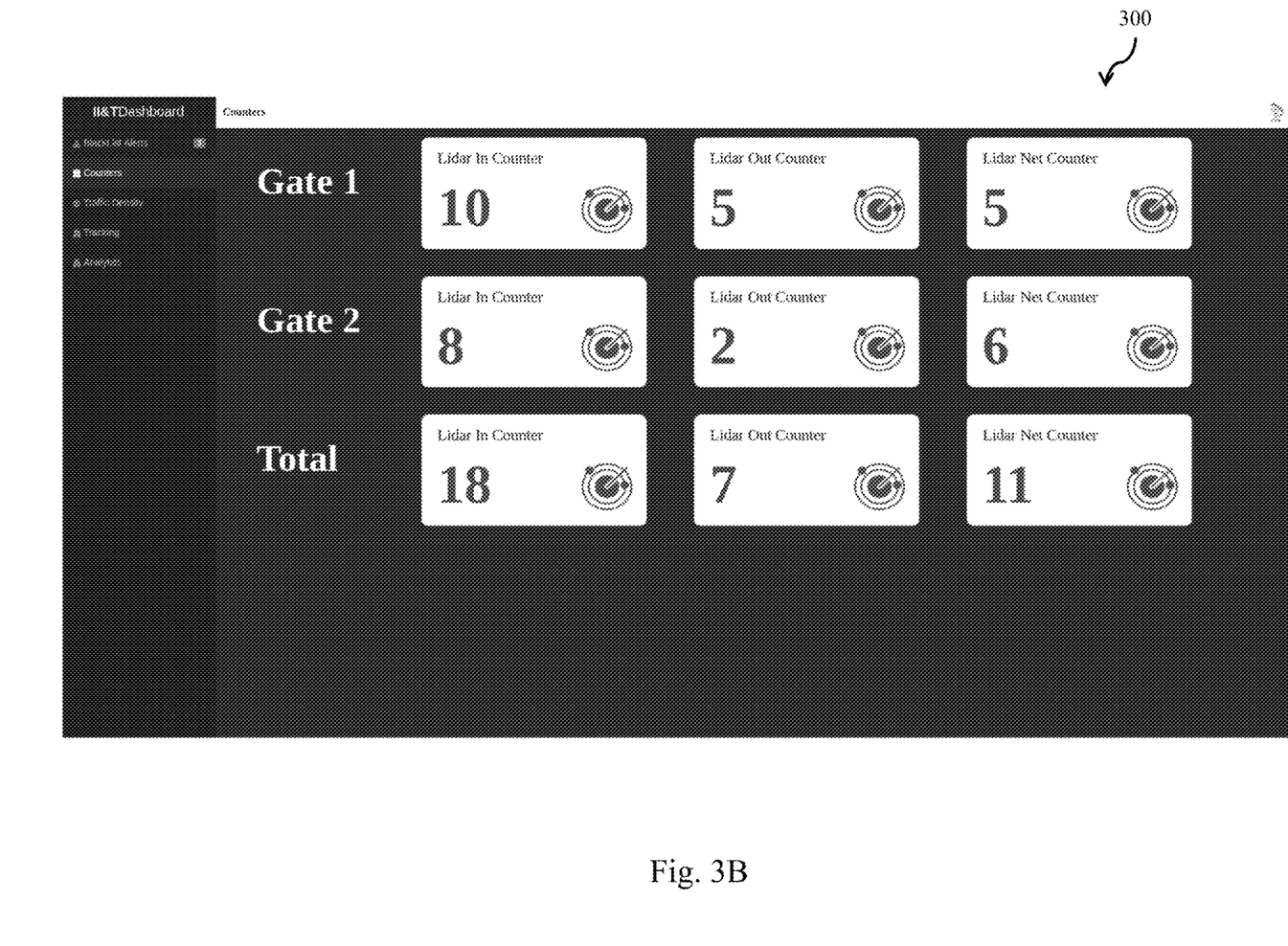

FIGS. 3A-3B illustrate a user interface 300 for an individual detection and tracking system according to embodiments of the present disclosure. In FIG. 3A, the user interface includes an analytics module. In various embodiments, the analytics module includes a graphical indication of the number of objects (e.g., patrons) who have entered and/or exited a point of entry (e.g., a gate) to a restricted area (e.g., a sports stadium). In various embodiments, where the restricted area has more than one point of entry, the systems described herein may be installed such that the system operates at multiple points of entry to the restricted area. For example, FIG. 3A shows number of people to enter and exit at two different points of entry (e.g., "Gate 1" and "Gate 2") to a restricted area. At Gate 1, 133 people have entered the restricted area and 94 have exited during the relevant monitoring period. At Gate 2, 115 people have entered the restricted area and 189 have exited during the relevant monitoring period. In various embodiments, the number of people entering/exiting each monitored point of entry may be displayed via a bar chart to visualize the numbers of people passing through (e.g., entering and/or exiting) the point of entry over a given period of time. In various embodiments, the period of time over which the number of people entering/exiting is displayed and/or visualized may be customized. For example a range of dates and/or times may be selected over which to visualize the activity at one or more points of entry.

FIG. 3B illustrates a user interface 300 including a counter module. The counter module includes a list of points of entry where the system is installed and monitoring the points of entry. The user interface 300 shows the number of objects (e.g., patrons) that have entered and exited through two points of entry (i.e., Gate 1 and Gate 2) in addition to the net counter for each point of entry. The user interface 300 further includes a total number of objects that have entered and exited in addition to a net total objects that remain in the restricted area.

In various embodiments, the system may include a blacklist module. In various embodiments, the blacklist module may include one or more pictures of peoples' faces who are no longer permitted entry to a restricted area. In various embodiments, the blacklist module may allow the uploading of one or more pictures in any suitable picture file format (e.g., tif, png, jpg, etc.). In various embodiments, when a person who has been blacklisted attempts to gain entry to a restricted area, the system may detect that the blacklisted person is attempting to gain entry and send an alert to a relevant party (e.g., event management, in-house security, police, etc.) who has interest in keeping the blacklisted person out of the restricted area.

In various embodiments, the systems described herein may include smart equipment (e.g., smart mechanical locks, doors, and/or barriers) installed at a point of entry. In various embodiments, the smart equipment may unlock (for a smart lock) and/or open (for a door/barrier) when an authorized person is detected as being in close proximity (e.g., 1 to 5 feet) of a monitored point of entry. In various embodiments, the smart equipment will not unlock and/or open when an unauthorized person approaches the monitored point of entry. In various embodiments, the system may send an alert to a relevant party (e.g., event management, in-house security, police, etc.) who has interest in keeping the unauthorized person from entering the restricted area through the point of entry. In various embodiments, the system may allow one person access to one or more points of entry, while not permitted access one or more other points of entry.

Figure 4:
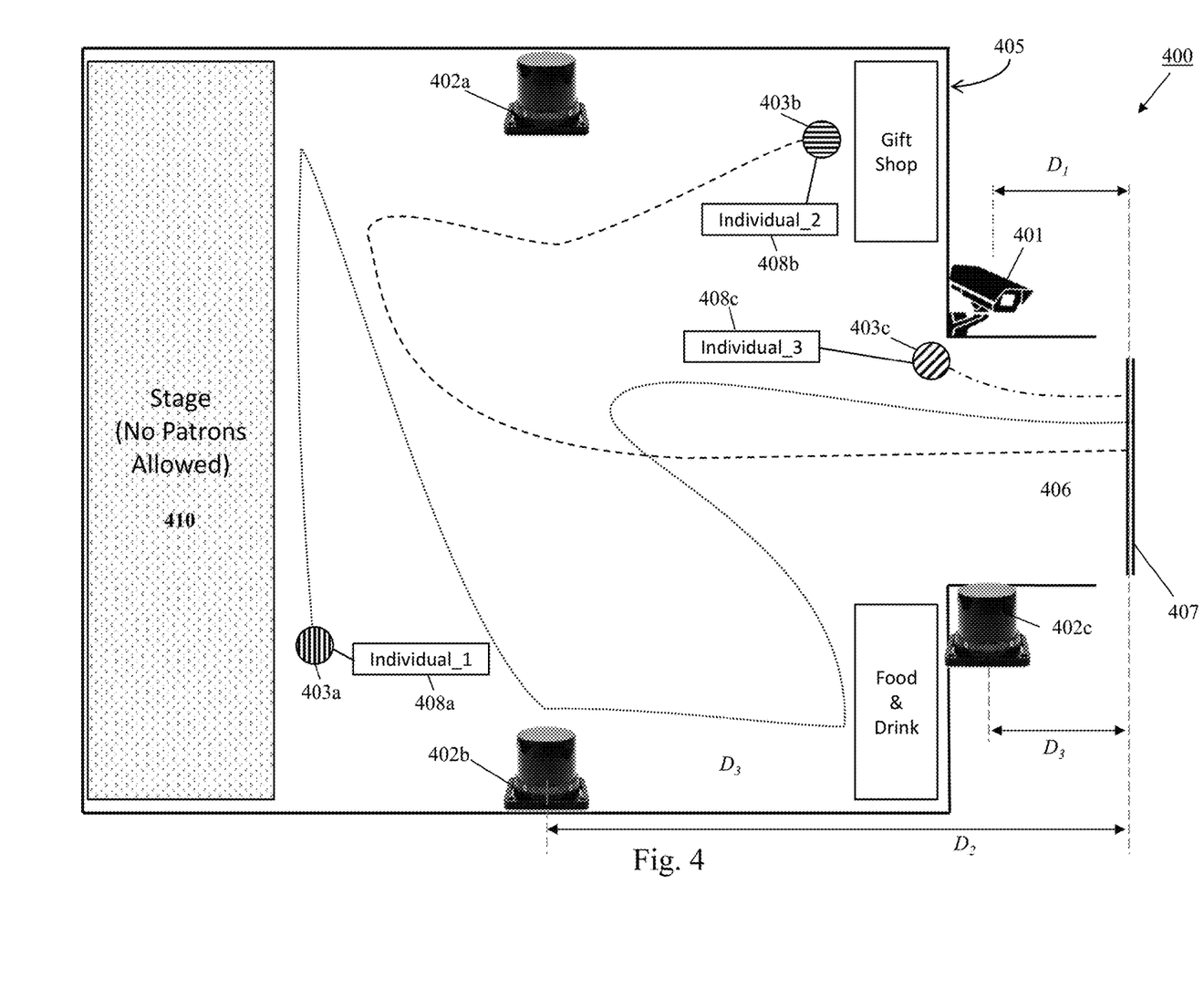
FIG. 4 illustrates an exemplary system for detection and tracking being used to monitor a restricted area according to embodiments of the present disclosure.

FIG. 4 illustrates an exemplary system 400 for detection and tracking being used to monitor a restricted area 405 according to embodiments of the present disclosure. The system 400 includes a first imaging modality 401 (e.g., video camera) and second imaging modality 402a-402c (e.g., LiDAR devices). The video camera 401 is positioned at the point of entry 406 into the restricted are 405 (e.g., an event space). The LiDAR devices 402a-402c may be placed in various suitable locations around the restricted area 405, for example, such that the restricted area is fully monitored.

In various embodiments, the system 400 may create a virtual plane 407 that represents to the system 400 a point of entry into the restricted area 405. In various embodiments, the virtual plane 407 may be where the video camera is focused such that the video camera 401 may best detect objects (e.g., people and/or faces) within its field of vision. In various embodiments, the virtual plane 407 may be a two-dimensional plane. In various embodiments, the virtual plane 407 may be substantially perpendicular to the ground. In various embodiments, the virtual plane 407 may be a three-dimensional surface (e.g., spherical). In various embodiments, the virtual plane 407 may be disposed at a first distance $D_1$ away from the first imaging modality 401. In various embodiments, the virtual plane 407 may be disposed at a second distance $D_2$ away from one or more of the second imaging modality 402a, 402b. In various embodiments, the virtual plane 407 may be disposed at a third distance $D_3$ away from one or more of the second imaging modality 402c. In some embodiments the distances $D_1$ and $D_2$ can be fixed or constant, and in some embodiments these distances are variable.

In FIG. 4, the system 400 detects a first person 403a a second person 403b and a third person 403c who have entered the point of entry 406 defined by the virtual plane 407 using the camera 401. In various embodiments, the system 400 may detect one or more people simultaneously or the detection may be sequentially. The camera 401 may detect a particular person by, for example, a facial recognition algorithm as is known to one skilled in the art. In various embodiments, facial recognition algorithms that may be used include principal component analysis using eigenfaces, linear discriminant analysis, elastic bunch graph matching using the Fisherface algorithm, the hidden Markov model, the multilinear subspace learning using tensor representation, and the neuronal motivated dynamic link matching. In various embodiments, the system 400 may look up and/or retrieve information about a detected face from a database. In various embodiments, the database may include pictures of faces and, optionally or additionally, information about the particular person. In various embodiments, if information (e.g., name, birthday, SSN, serial number, ticket number, license number, etc.) is associated with the person's face, the system 400 may assign a unique identifier 408a-408c to that person using the retrieved information. In various embodiments, regardless of whether information exists or not for the particular person, a serial number (e.g., alphanumeric characters) may be assigned to the particular individual. In various embodiments, the unique identifier may be anonymized.

In various embodiments, when any of the first, second, and third persons 403a-403c walk through the plane 407, one or more of the LiDAR devices 402a-402c detect the persons 403a-403c and generate a point cloud including the three-dimensional shapes of each person 403a-403c. When the camera 401 detects the first person 403*a* via, e.g., facial recognition and retrieves a unique identifier for that person 403*a*, the system 400 associates that unique identifier with the object generated in the LiDAR point cloud effectively passing off monitoring of the person 403*a* to the LiDAR devices 402*a*-402*c*. The system 400 then records the three-dimensional positional information of the person 403*a* as they move through the restricted area 405.

In various embodiments, the system 400 may generate a graph (e.g., a map) for visualizing the 2D or 3D position of one or more people over time. In various embodiments, the system may include tools to allow a user to controllably visualize the movement of one or more people within the restricted area over time. For example, the user may want to know what happened over a particular period time and, thus, may select that particular period of time to review at a 1× speed or faster (e.g., 2×, 5×, 10×) speed.

In various embodiments, one or more regions within the restricted area 406 may be labelled with varying levels of security. For example, a region 410 (e.g., stage) in the restricted area 405 is labelled with a higher security level such that no patrons are permitted to enter. The system 400 may send an alert (e.g., email, call, text message, etc.) to a relevant party (e.g., event management, in-house security, police, etc.) who has interest in keeping the unauthorized person from entering the region 410 having a higher security level. In this example, one or more performers may be assigned a higher level of security clearance such that they may enter the secure region 410 without the system 400 alerting the relevant party.

The systems, methods, and computer program products described herein may be implemented in any suitable areas where access may be restricted and/or monitored to individuals, including, but not limited to, concerts, sporting events, businesses, government buildings, airports, train/subway stations, public outdoor spaces, and/or any other suitable areas.

Figure 5:
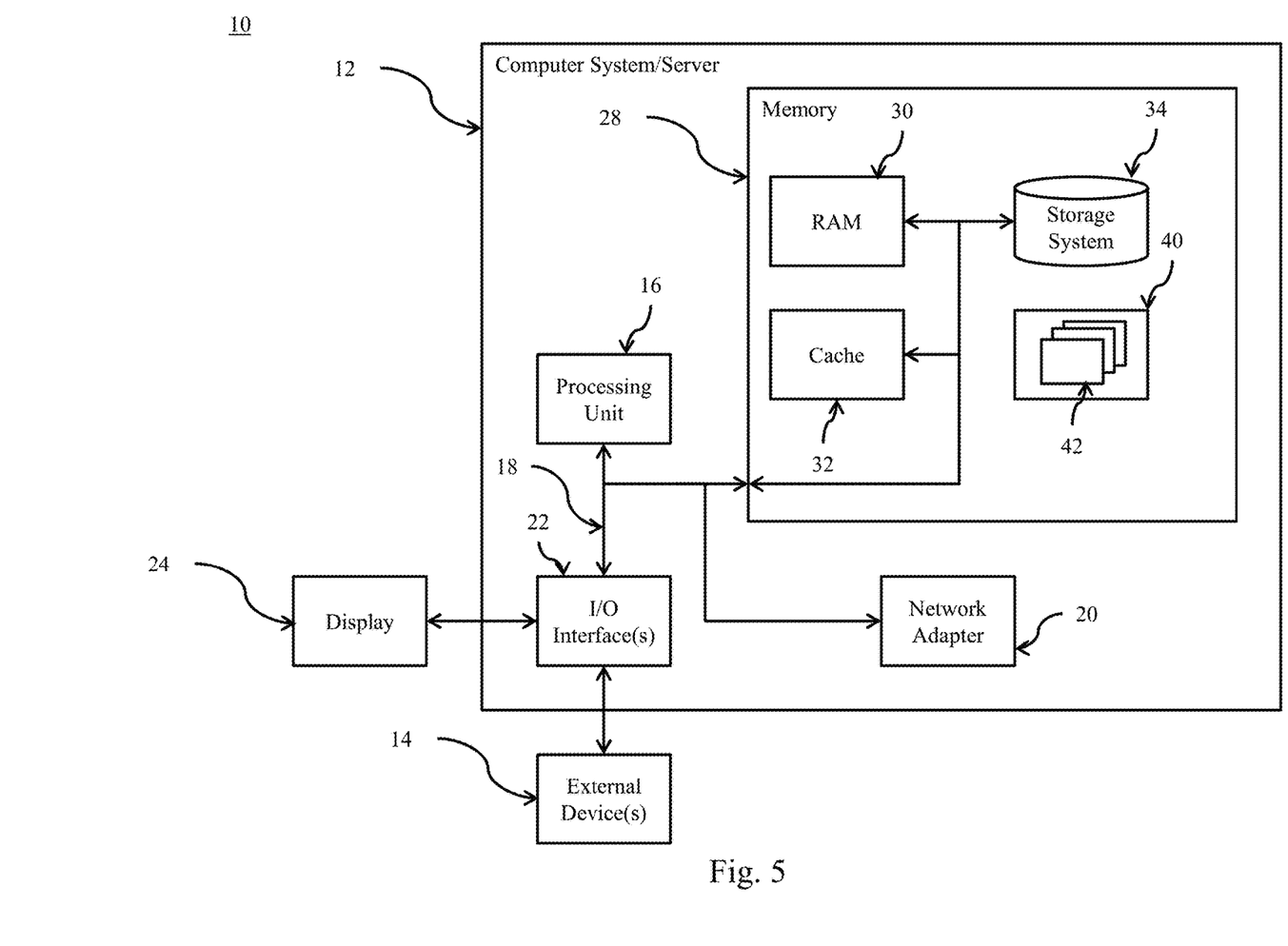
FIG. 5 depicts a computing node according to embodiments of the present disclosure.

Referring now to FIG. 5, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for data continuity across multiple imaging modalities, the system comprising:
    a first imaging modality having a first imaging field;
    a second imaging modality having a second imaging field;
    a computing node comprising a computer readable storage medium having program instructions embodied therewith, the program instructions executable by a processor of the computing node to cause the processor to perform a method comprising:
        generating a virtual plane disposed at a first distance from the first imaging modality and a second distance from the second imaging modality, wherein the virtual plane is within the first imaging field and within the second imaging field;
        recording a video frame via the first imaging modality, the video frame comprising the virtual plane;
        detecting, at the first imaging modality, one or more objects in the video frame at a first timepoint when the one or more objects enters the virtual plane;
        assigning an identifier to each of the one or more objects;
        detecting, at the second imaging modality, one or more three-dimensional shapes at a second timepoint when the one or more three-dimensional shapes enters the virtual plane, wherein the second timepoint is coincident with the first time point;
        for each of the one or more objects, determining a corresponding shape of the one or more three-dimensional shapes;
        assigning each identifier to the respective corresponding shape of the one or more three-dimensional shapes; and
        after assigning each identifier, recording a plurality of positional data via the second imaging modality for each of the one or more three-dimensional shapes; and
        associating the plurality of positional data for each of the one or more three-dimensional shapes with a corresponding object of the one or more objects.

2. The system according to claim 1, wherein the first imaging modality comprises a digital camera.

3. The system according to claim 1, wherein the second imaging modality comprises one or more LiDAR sensors.

4. The system according to claim 1, wherein first distance is greater than the second distance.

5. The system according to claim 1, wherein first distance is less than the second distance.

6. The system according to claim 1, wherein first distance and the second are substantially equal.

7. The system according to claim 1, wherein at least one of the first distance and the second distance is adjustable.

8. The system according to claim 1, wherein at least one of the first distance and the second distance is fixed.

9. The system according to claim 1, wherein the virtual plane is a two-dimensional plane.

10. The system according to claim 1, wherein the virtual plane is a three-dimensional surface.

11. The system according to claim 1, wherein virtual plane is substantially perpendicular to a ground surface.

12. The system according to claim 1, wherein each identifier comprises a name.

13. The system according to claim 1, wherein each identifier is anonymized.

14. The system according to claim 1, wherein each identifier comprises a serial number.

15. The system according to claim 1, further comprising calibrating the first imaging modality and the second imaging modality based on the first distance and the second distance.

16. The system according to claim 1, wherein the one or more objects are detected using a facial recognition algorithm.

17. The system according to claim 1, wherein the detecting one or more objects and detecting one or more three-dimensional shapes is performed substantially simultaneously.

18. A method for data continuity across multiple imaging modalities, the method comprising:
    generating a virtual plane disposed at a first distance from a first imaging modality and a second distance from a second imaging modality, wherein the virtual plane is within an imaging field of each of the first imaging modality and the second imaging modality;
    recording a video frame via the first imaging modality, the video frame comprising the virtual plane;
    detecting, at the first imaging modality, one or more objects in the video frame at a first timepoint when the one or more objects enters the virtual plane;
    assigning an identifier to each of the one or more objects;
    detecting, at the second imaging modality, one or more three-dimensional shapes at a second timepoint when the one or more three-dimensional shapes enters the virtual plane wherein the second timepoint is coincident with the first timepoint;
    for each of the one or more objects, determining a corresponding shape of the one or more three-dimensional shapes;
    assigning each identifier to the respective corresponding shape of the one or more three-dimensional shapes; and
    after assigning each identifier, recording a plurality of positional data via the second imaging modality for each of the one or more three-dimensional shapes; and
    associating the plurality of positional data for each of the one or more three-dimensional shapes with a corresponding object of the one or more objects.

19. A computer program product for data continuity across multiple imaging modalities, the computer program product comprising a computer readable storage medium having program instructions embodied therewith, the program instructions executable by a processor to cause the processor to perform a method comprising:
    generating a virtual plane disposed at a first distance from a first imaging modality and a second distance from a second imaging modality, wherein the virtual plane is within an imaging field of each of the first imaging modality and the second imaging modality;

recording a video frame via the first imaging modality, the video frame comprising the virtual plane;

detecting, at the first imaging modality, one or more objects in the video frame at a first timepoint when the one or more objects enters the virtual plane;

assigning an identifier to each of the one or more objects;

detecting, at the second imaging modality, one or more three-dimensional shapes at a second timepoint when the one or more three-dimensional shapes enters the virtual plane wherein the second timepoint is coincident with the first time point;

for each of the one or more objects, determining a corresponding shape of the one or more three-dimensional shapes;

assigning each identifier to the respective corresponding shape of the one or more three-dimensional shapes; and after assigning each identifier, recording a plurality of positional data via the second imaging modality for each of the one or more three-dimensional shapes; and associating the plurality of positional data for each of the one or more three-dimensional shapes with a corresponding object of the one or more objects.

* * * * *